United States Patent
Yuzawa et al.

(10) Patent No.: US 10,205,793 B2
(45) Date of Patent: Feb. 12, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventors: Hideto Yuzawa, Kanagawa (JP); Takayuki Takeuchi, Kanagawa (JP); Masahiro Sato, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 454 days.

(21) Appl. No.: 14/100,635

(22) Filed: Dec. 9, 2013

(65) Prior Publication Data
US 2014/0357252 A1 Dec. 4, 2014

(30) Foreign Application Priority Data

May 30, 2013 (JP) ................. 2013-114294

(51) Int. Cl.
*H04W 8/24* (2009.01)
*H04L 29/08* (2006.01)
*H04M 3/42* (2006.01)

(52) U.S. Cl.
CPC ........ *H04L 67/24* (2013.01); *H04M 3/42374* (2013.01)

(58) Field of Classification Search
CPC .......... H04M 3/42365; H04M 3/42093; H04L 51/04; H04L 12/581; H04L 51/043; H04L 67/24
See application file for complete search history.

(56) References Cited

U.S. PATENT DOCUMENTS

2003/0041101 A1* 2/2003 Hansche ................. H04L 29/06
709/203
2006/0031370 A1* 2/2006 Lyle ...................... H04L 12/581
709/207
(Continued)

FOREIGN PATENT DOCUMENTS

JP 2003-244317 A 8/2003
JP 2006-238112 A 9/2006
(Continued)

OTHER PUBLICATIONS

Communication dated Jun. 21, 2016 from the Japanese Patent Office in counterpart application No. 2013-114294.
(Continued)

*Primary Examiner* — Erica Navar
(74) *Attorney, Agent, or Firm* — Sughrue Mion, PLLC

(57) ABSTRACT

An information processing apparatus includes a receiving unit, a determining unit, and a transmission controller. The receiving unit receives a notification to inquire about a state of a user of the information processing apparatus, which is portable, from a different information processing apparatus. If the notification is received by the receiving unit, the determining unit determines whether communication from the other information processing apparatus is acceptable in the state of the user. If the determination unit determines that the communication from the other information processing apparatus is not acceptable in the state of the user, the transmission controller controls transmission so as not to transmit the state of the user.

14 Claims, 16 Drawing Sheets

(56) References Cited

U.S. PATENT DOCUMENTS

| | | | |
|---|---|---|---|
| 2006/0149816 A1* | 7/2006 | Cadiz | H04L 12/5815 709/206 |
| 2007/0153709 A1* | 7/2007 | Choi | H04L 67/24 370/254 |
| 2012/0225652 A1* | 9/2012 | Martinez | H04M 3/42374 455/435.1 |

FOREIGN PATENT DOCUMENTS

| | | |
|---|---|---|
| JP | 2006-279653 A | 10/2006 |
| JP | 2008-28773 A | 2/2008 |
| JP | 2008-197843 A | 8/2008 |
| JP | 2012-213012 A | 11/2012 |

OTHER PUBLICATIONS

Communication dated Jan. 24, 2017 from the Japanese Patent Office in counterpart application No. 2013-114294.

* cited by examiner

FIG. 15

| COMMUNICATION METHOD | LOCATION | STATE |
|---|---|---|
| TELEPHONE | NULL | ON PHONE |
| TELEPHONE | NULL | DURING MEETING |
| F2F | LOCATION DIFFERENT FROM THAT OF PRESENCE USE REQUESTER | NULL |
| F2F | NULL | ON PHONE |
| F2F | NULL | DURING MEETING |
| ⋮ | ⋮ | ⋮ |

1510    1520    1530    1500

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-114294 filed May 30, 2013.

BACKGROUND

Technical Field

The present invention relates to an information processing apparatus, an information processing method, and a non-transitory computer readable medium.

SUMMARY

According to an aspect of the invention, there is provided an information processing apparatus including a receiving unit, a determining unit, and a transmission controller. The receiving unit receives a notification to inquire about a state of a user of the information processing apparatus, which is portable, from a different information processing apparatus. If the notification is received by the receiving unit, the determining unit determines whether communication from the other information processing apparatus is acceptable in the state of the user. If the determination unit determines that the communication from the other information processing apparatus is not acceptable in the state of the user, the transmission controller controls transmission so as not to transmit the state of the user.

BRIEF DESCRIPTION OF THE DRAWINGS

Exemplary embodiments of the present invention will be described in detail based on the following figures, wherein:

FIG. 15 is a descriptive diagram illustrating an exemplary data structure of a non-acceptable state table for-every-communication-method.

DETAILED DESCRIPTION

Exemplary embodiments of the present invention will herein be described with reference to the attached drawings.

Figure 1:
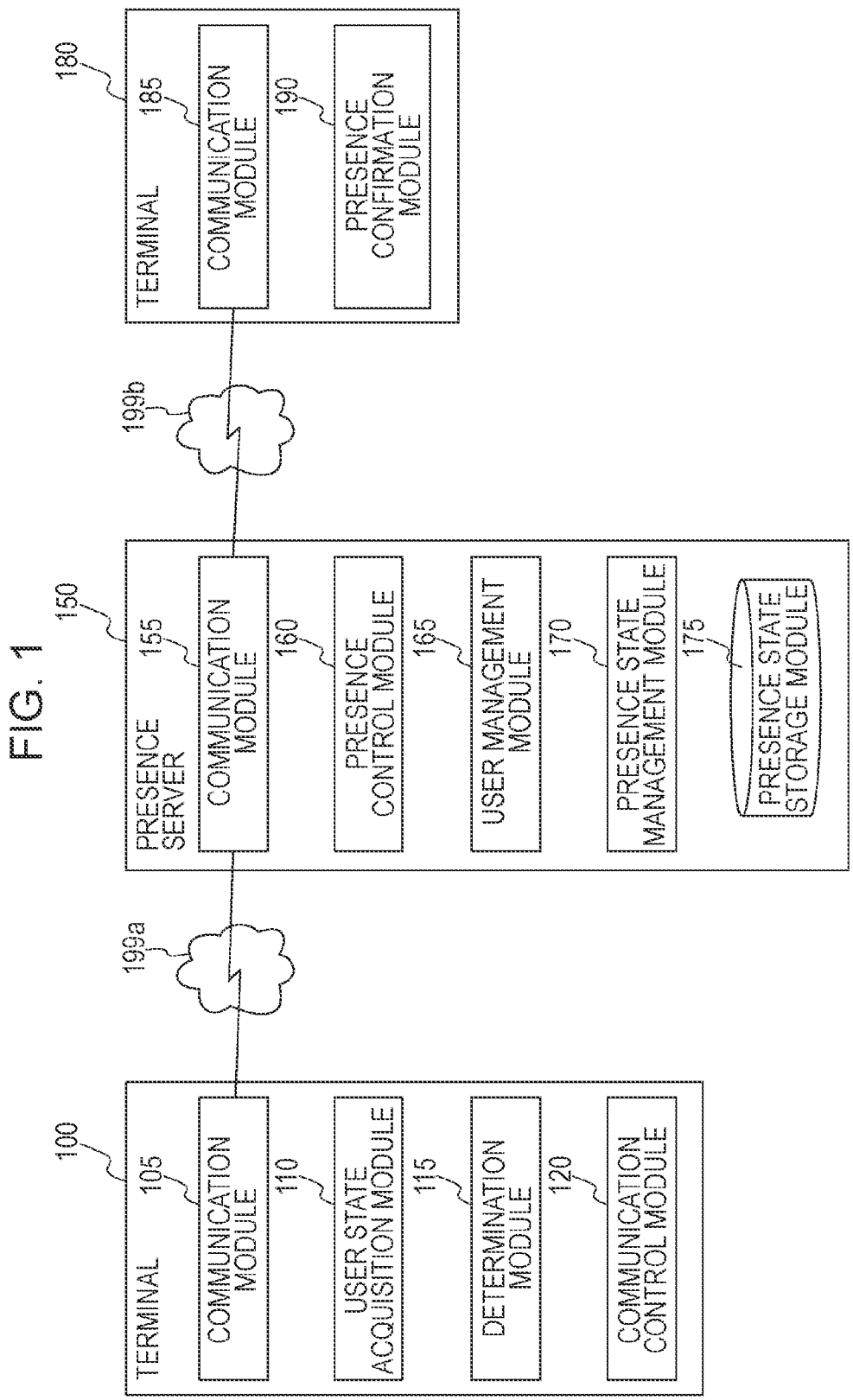
FIG. 1 conceptually illustrates the module configuration diagram of an exemplary configuration according to a first exemplary embodiment.

FIG. 1 conceptually illustrates the module configuration diagram of an exemplary configuration according to a first exemplary embodiment.

Modules generally mean components, such as software (computer programs) or hardware, which are capable of being logically separated. Accordingly, the modules in the exemplary embodiments mean not only the modules in the computer programs but also the modules in a hardware configuration. The computer programs (the programs causing a computer to execute processes, the programs causing the computer to function as units, and the programs causing the computer to realize functions), systems, and methods for realizing the functions of such modules are also described in the exemplary embodiments. However, although words of "storing", "stored", and the likes are used for convenience, these words mean "storing something in a storage unit" or "causing a component to store something in the storage unit" when the computer programs are described in the exemplary embodiments. The modules may have one-to-one correspondence with functions. In installation, one module may be composed of one program, multiple modules may be composed of one program, or one module may be composed of multiple programs. Multiple modules may be executed by one computer or one module may be executed by multiple computers in a distributed or parallel environment. One module may include other modules. "Connection" is hereinafter used not only for physical connection but also for logical connection (for example, transmission and reception of data, instructions, and reference relationship between pieces of data). "Predetermined" means that something is determined before a target process is performed and is used to include the determination in accordance with the current status or state or in accordance with the previous statuses or states as long as before the target process is performed even before a process according to an exemplary embodiment is started or even after the process according to the exemplary embodiment is started. When multiple "predetermined values" exist, the multiple predetermined values may be different from each other or two or more values (including all the values) may be equal to each other. A description in which "B is performed if A" means that "it is determined whether A and, if it is determined that A, B is performed." However, a case in which the determination of whether A is not necessary is excluded.

A system or an apparatus may have a configuration in which multiple computers, multiple hardware components, multiple units, or the likes are connected via a communication unit, such as a network (including one-to-one correspondence communication connection), and may also include a case in which the system or the apparatus is realized by one computer, one hardware component, one unit, or the like. The "apparatus" and the "system" are used as synonyms. The "system" does not include a social "mechanism" (social system) that is an artificial agreement.

When multiple processes are performed for every processing in each module or in the module, target information is read out from a storage unit for every processing and the result of the processing is written into the storage unit after the processing is performed. Accordingly, the description of the readout from the storage unit before the processing and the writing into the storage unit after the processing may be omitted. The storage unit may be a hard disk, a random access memory (RAM), an external storage medium, a storage unit via a communication line, a register in a central processing unit (CPU), or the like.

An information processing apparatus (terminal 100) according to the first exemplary embodiment communicates with a terminal 180. Referring to FIG. 1, the terminal 100, a presence server 150, and the terminal 180 are connected to each other via a communication line 199a and a communication line 199b. The "communication" here means communication from a user of the terminal 180 to a user of the terminal 100. Specifically, the communication means communication (phone call with, for example, a television telephone or an Internet protocol (IP) telephone) from the terminal 180 to the terminal 100 with an operation by the user. Although the communication line 199a and the communication line 199b are generally wireless communication, the communication line 199a and the communication line 199b may be wired communication.

The terminal 100 includes a communication module 105, a user state acquisition module 110, a determination module 115, and a communication control module 120.

The communication module 105 is connected to a communication module 155 in the presence server 150 via the communication line 199a. The communication module 105 is used to communicate with the terminal 180 via the communication line 199a, the presence server 150, and the communication line 199b. The communication module 105 receives a notification to inquire about the state of the user of the terminal 100, which is portable, from the other terminal 180, which is portable. This inquiry notification is also referred to as a presence use request. The notification from the terminal 180 may be directly transmitted from the terminal 180 or may be transmitted from the terminal 180 via the presence server 150. The state may be directly transmitted to the terminal 180 or may be transmitted to the terminal 180 via the presence server 150.

The communication module 105 may receive a communication method from the terminal 180, in addition to the presence use request. The "communication method" here means a method of communication from the user of the terminal 180 to the user of the terminal 100 after a reply indicating that the communication from the terminal 180 is acceptable in the state of the user of the terminal 100 is transmitted from the terminal 100 to the terminal 180 in response to the presence use request. Specifically, the communication method is, for example, a phone call or a face-to-face interview (also referred to as a "face to face meeting" or a "direct meeting": such a meeting is hereinafter also referred to as "face to face (F2F)").

When the communication method is the F2F, the communication module 105 may receive the position of the terminal 180 (the user of the terminal 180).

The communication module 105 may receive a request to cancel the notification from the terminal 180 after the notification of the presence use request is received.

The user state acquisition module 110 acquires the state of the user of the terminal 100. For example, the user state acquisition module 110 may indicate that the presence use request is received from the user of the terminal 180 in a display unit in the terminal 100 to prompt the user of the terminal 100 to input the current state with an operation with a keyboard, a touch panel, etc. of the terminal 100. Alternatively, the user state acquisition module 110 may refer to an electronic diary of the user of the terminal 100 to acquire the current plan in the diary. Alternatively, the user state acquisition module 110 may use a global positioning system (GPS), an acceleration sensor, a sound pressure (audio) sensor (for example, a microphone), an optical sensor, a geomagnetic sensor, or the like to acquire the state of the user of the terminal 100. These sensors may be incorporated in the terminal 100 or may be held by the user. When the sensor is held by the user, the user state acquisition module 110 may communicate with the sensor to acquire the result of the detection by the sensor. For example, the user state acquisition module 110 may detect the location of the user of the terminal 100 from an output from the GPS. The user state acquisition module 110 may detect the fact that the user of the terminal 100 is moving or the user of the terminal 100 is at rest from an output from the acceleration sensor or may detect the fact that the user of the terminal 100 is talking from an output from the sound pressure sensor. The user state acquisition module 110 may detect the state of a telephone module in the terminal 100 to detect the fact that the user of the terminal 100 is on the phone. The user state acquisition module 110 may communicate with a communication unit (a communication relay unit) provided in, for example, a meeting room and may detect the location of the communication unit to detect the location of the terminal 100 (the location where the user of the terminal 100 exists). Alternatively, a combination of multiple detection methods, among the detection methods described above, may be used. For example, the user state acquisition module 110 may recognize the fact that the user of the terminal 100 is out of the office from an output from the GPS and the fact that the user of the terminal 100 is walking from an output from the acceleration sensor. In the determination of whether the user of the terminal 100 is out of the office with the output from the GPS, the user state acquisition module 110 may recognize that the user of the terminal 100 is not out of the office if the user of the terminal 100 is within a range of the locations (for example, a building where the office of the user is located) in which the user of the terminal 100 usually stays and which is registered in advance and may recognize that the user of the terminal 100 is out of the office if the user of the terminal 100 is outside the range.

Figure 14:
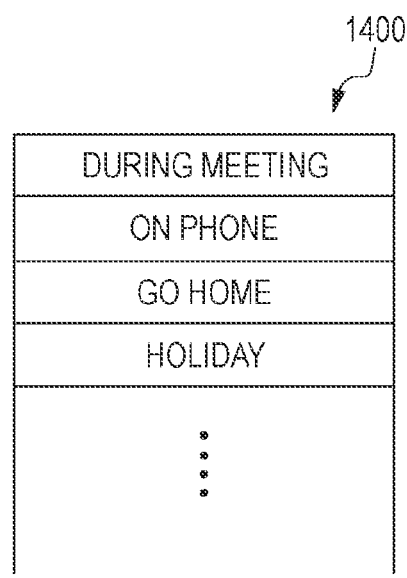
FIG. 14 is a descriptive diagram illustrating an exemplary data structure of a non-acceptable state list.

The determination module 115 determines whether the communication from the terminal 180 is acceptable in the state of the user of the terminal 100 when the notification is received by the communication module 105. The determination is based on a list of non-acceptable states. The determination module 115 determines that the communication from the terminal 180 is not acceptable if the current state is in the list. For example, a non-acceptable state list 1400 is used as the list. FIG. 14 is a descriptive diagram illustrating an exemplary data structure of the non-acceptable state list 1400. For example, "during meeting", "on phone", "go home", and "holiday" are stored in the non-acceptable state list 1400. Specifically, the determination module 115 determines that the communication from the terminal 180 is non-acceptable if the state of the user of the terminal 100 is included in the non-acceptable state list 1400. The determination module 115 determines that the communication from the terminal 180 is acceptable if the state of the user of the terminal 100 is not included in the non-acceptable state list 1400.

When the notification is received by the communication module 105, the determination module 115 may determine whether the communication method received by the communication module 105 is acceptable in the state of the user of the terminal 100. The determination of whether the communication method is acceptable in the state may be based on a table in which the "communication methods" are stored in association with at least the "states." In this case, the determination may be performed by extracting "information indicating whether the communication method is acceptable" in the table, which corresponds to the detected state of the user and the request from the other terminal. For example, a non-acceptable state table for-every-communication-method 1500 is used as the table. FIG. 15 is a descriptive diagram illustrating an exemplary data structure of the non-acceptable state table for-every-communication-method 1500. The non-acceptable state table for-every-communication-method 1500 includes a communication method column 1510, a location column 1520, and a state column 1530. The communication methods from the user of the terminal 180 are stored in the communication method column 1510. The locations that are inappropriate (non-accessible) in combinations with the states stored in the state column 1530 in the communication by the respective communication methods are stored in the location column 1520. When "Null" is specified in the location column 1520, any location is determined to be non-accessible if the state corresponds to the state stored in the state column 1530. The states that are inappropriate (non-accessible) in combinations with the locations stored in the location column 1520 in the communication by the respective communication methods are stored in the state column 1530. When "Null" is specified in the state column 1530, any state is determined to be non-accessible if the location corresponds to the location stored in the location column 1520.

When the communication method received by the communication module 105 (the communication method transmitted from the terminal 180) is included in the communication method column 1510, it is determined to be non-acceptable if the state of the user of the terminal 100 corresponding to the communication method is included in the location column 1520 and the state column 1530. It is determined that the communication from the terminal 180 is acceptable if the state of the user of the terminal 100 is not included in the location column 1520 nor the state column 1530.

In the non-acceptable state table for-every-communication-method 1500, when "Telephone" is specified in the communication method column 1510, "Null" is specified in the location column 1520, and "On phone" is specified in the state column 1530, the communication method is non-acceptable regardless of the location if the state is on the phone when the communication method is the telephone. When "Telephone" is specified in the communication method column 1510, "Null" is specified in the location column 1520, and "During meeting" is specified in the state column 1530, the communication method is non-acceptable regardless of the location if the state is during a meeting when the communication method is the telephone. When "F2F" is specified in the communication method column 1510, "Location different from that of presence use requester" is specified in the location column 1520, and "Null" is specified in the state column 1530, the communication method is non-acceptable regardless of the state if the location is different from that of a presence use requester when the communication method is the F2F. When "F2F" is specified in the communication method column 1510, "Null" is specified in the location column 1520, and "On phone" is specified in the state column 1530, the communication method is non-acceptable regardless of the location if the state is on the phone when the communication method is the F2F. When "F2F" is specified in the communication method column 1510, "Null" is specified in the location column 1520, and "During meeting" is specified in the state column 1530, the communication method is non-acceptable regardless of the location if the state is during a meeting when the communication method is the F2F.

Although the determination module 115 performs the determination on the basis of the combination of the location column 1520 and the state column 1530 with the communication method column 1510 in the non-acceptable state table for-every-communication-method 1500, the determination module 115 may perform the determination on the basis of the combination of only the state column 1530 with the communication method column 1510. In this case, it is sufficient for the non-acceptable state table for-every-communication-method 1500 to include the communication method column 1510 and the state column 1530. Although "Null" is specified in either of the location column 1520 and the state column 1530 in the example in FIG. 15, conditions may be stored in both the location column 1520 and the state column 1530. For example, when the location is "Customer site" and the state is "During meeting", the communication method "Telephone" may be determined to be non-acceptable.

The communication control module 120 controls the communication module 105 so that the state of the user of the terminal 100 is not transmitted to the terminal 180 if the determination module 115 determines that the communication method is not acceptable.

The communication control module 120 may control the communication module 105 so that the state of the user of the terminal 100 is transmitted to the terminal 180 as a reply to the notification received by the communication module 105 only if the determination module 115 determines that the communication method is acceptable.

The communication control module 120 may control the communication module 105 so that the state of the user of the terminal 100 is not transmitted to the terminal 180 if the communication module 105 receives the cancel request.

The communication control module 120 may control the communication module 105 so that the state of the user of the terminal 100 is transmitted to the terminal 180 if the result of the determination by the determination module 115 is changed from the non-acceptable determination to the acceptable determination.

The presence server 150 includes the communication module 155, a presence control module 160, a user management module 165, a presence state management module 170, and a presence state storage module 175. The presence server 150 controls the communication concerning presence between the terminal 100 and the terminal 180 to manage presence information.

The communication module 155 is connected to the communication module 105 in the terminal 100 via the communication line 199a and is connected to a communication module 185 in the terminal 180 via the communication line 199b. The communication module 155 relays the communication in order to manage the communication concerning the presence between the terminal 100 and the terminal 180.

The presence control module 160 controls the transmission to the other terminal in accordance with the presence use request between the terminal 100 and the terminal 180. However, the communication from the terminal 180 is transmitted to the terminal 100, which is the destination, and the communication from the terminal 100 is transmitted to the terminal 180, which is the destination, in the first exemplary embodiment.

The user management module 165 manages the user of the terminal 100 and the user of the terminal 180.

The presence state management module 170 manages the presence state storage module 175 in accordance with the communication concerning the presence use request between the terminal 100 and the terminal 180. In addition, the presence state management module 170 updates a presence use state managed by the presence state storage module 175 when the presence use request is received from a terminal other than the terminal 180.

The use state of the terminal 180 using the presence information (for example, the presence of the terminal 180 using the presence information and/or the use count) is registered in association with the terminal 100 in the presence state storage module 175.

The terminal 180 includes the communication module 185 and a presence confirmation module 190.

The communication module 185 is connected to the communication module 155 in the presence server 150 via the communication line 199*b*. The communication module 185 transmits the notification to inquire about the state of the user of the terminal 100 to the terminal 100 via the presence server 150. Specifically, as described above, the communication module 185 transmits the presence use request to be received by the communication module 105. The communication module 185 may transmit the communication method from the terminal 180 (the communication method from the user of the terminal 180) that is included in the inquiry notification. Specifically, as described above, the communication module 185 may transmit the communication method to be received by the communication module 105. The communication module 185 may transmit the position of the terminal 180 (the user of the terminal 180) if the communication method is the F2F. Specifically, as described above, the communication module 185 may transmit the position to be received by the communication module 105. The position is, for example, a coordinate output from a GPS included in the terminal 180.

The communication module 185 may transmit a request to cancel the notification of the presence use request to the terminal 100 after the communication module 185 transmits the notification of the presence use request to the terminal 100.

The presence confirmation module 190 inquires about the state of the user of the terminal 100 before the terminal 180 establishes the communication with the user of the terminal 100 (the presence use request). If the reply indicating that the communication method is acceptable is transmitted, the presence confirmation module 190 communicates with the user of the terminal 100. For example, the presence confirmation module 190 generates the presence use request in response to an operation with, for example, operation keys or the touch panel of the terminal 100 and transmits the presence use request to the presence server 150 via the communication module 185 and the communication line 199*b*.

Figure 2:
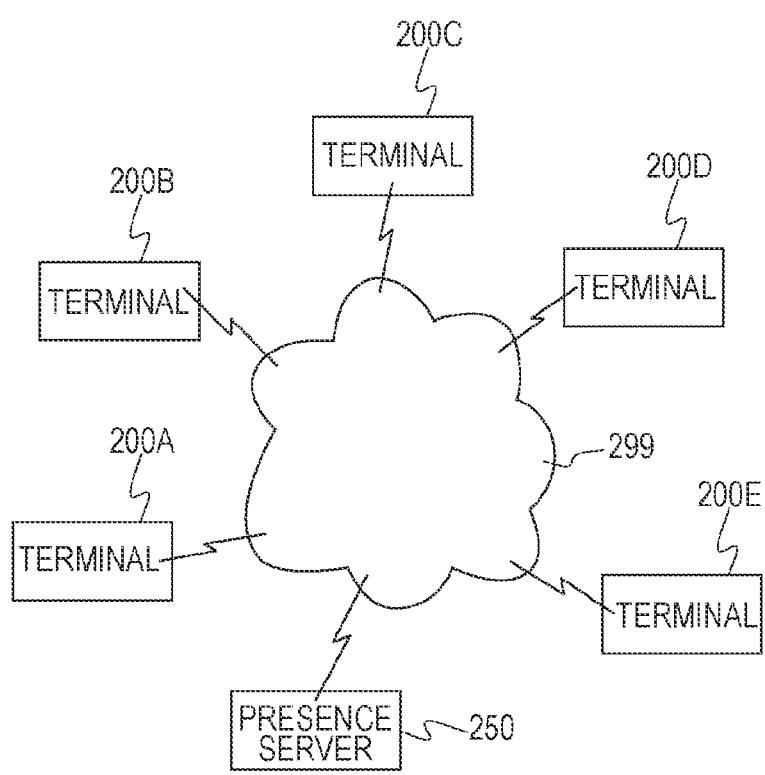
FIG. 2 is a descriptive diagram illustrating an exemplary configuration of a system when the exemplary embodiments are realized.

FIG. 2 is a descriptive diagram illustrating an exemplary configuration of a system when the exemplary embodiments are realized.

Referring to FIG. 2, a terminal 200A, a terminal 200B, a terminal 200C, a terminal 200D, a terminal 200E, and a presence server 250 are connected to each other via a communication line 299. The presence server 150 illustrated in FIG. 1 corresponds to the presence server 250, the terminal 100 and the terminal 180 illustrated in FIG. 1 each correspond to any of the terminals 200A to 200E, and the communication line 199*a* and the communication line 199*b* illustrated in FIG. 1 each correspond to the communication line 299.

Although the five terminals are exemplified in FIG. 2, the number of the terminals is not limited to five as long as multiple terminals are included in the system. Multiple presence servers 250 may be included in the system.

Figure 3:
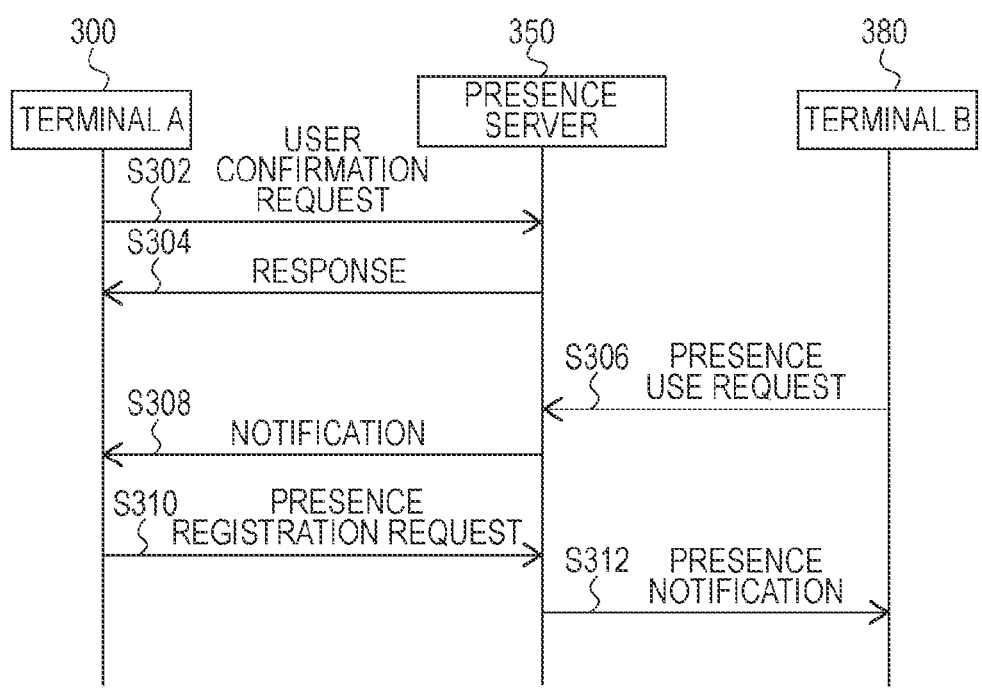
FIG. 3 is a flowchart illustrating a general exemplary presence process.

FIG. 3 is a flowchart illustrating a general exemplary presence process. The exemplary process illustrated in the flowchart in FIG. 3 is not a process according to the exemplary embodiments.

Referring to FIG. 3, in Step S302, a terminal A 300 submits a user confirmation request to a presence server 350. The terminal A 300 generates a user confirmation request message, which is a message to request confirmation of the user of the terminal A 300, in response to an operation by the user to transmit the user confirmation request message to the presence server 350.

In Step S304, the presence server 350 returns a response to the terminal A 300. Upon reception of the user confirmation request message, the presence server 350 generates a presence user confirmation response message, which is a response to the user confirmation request message, to transmit the presence user confirmation response message to the terminal A 300. The terminal A 300 acquires information concerning the use state of another terminal B 380 using the presence information for the terminal A 300 (for example, the presence of the other terminal B 380 using the presence information about the terminal A 300 and/or the use count) from the presence user confirmation response message and determines the presence of the other terminal B 380 using the presence information for the terminal A 300 on the basis of the acquired information (in other words, the terminal A 300 determines whether at least one terminal B 380 using the presence information for the terminal A 300 exists on the basis of the acquired information).

In Step S306, the terminal B 380 submits the presence use request to the presence server 350.

In Step S308, the presence server 350 notifies the terminal A 300 of the presence use request.

In Step S310, the terminal A 300 submits a presence registration request to the presence server 350.

In Step S312, the presence server 350 transmits a presence notification to the terminal B 380.

As described above, the reply is returned to the presence use request with no exception in the process that is not according to the exemplary embodiments to cause wasteful communication (Step S310 and Step S312) if the communication method is non-acceptable in the state of the user of the terminal A 300.

Figure 4:
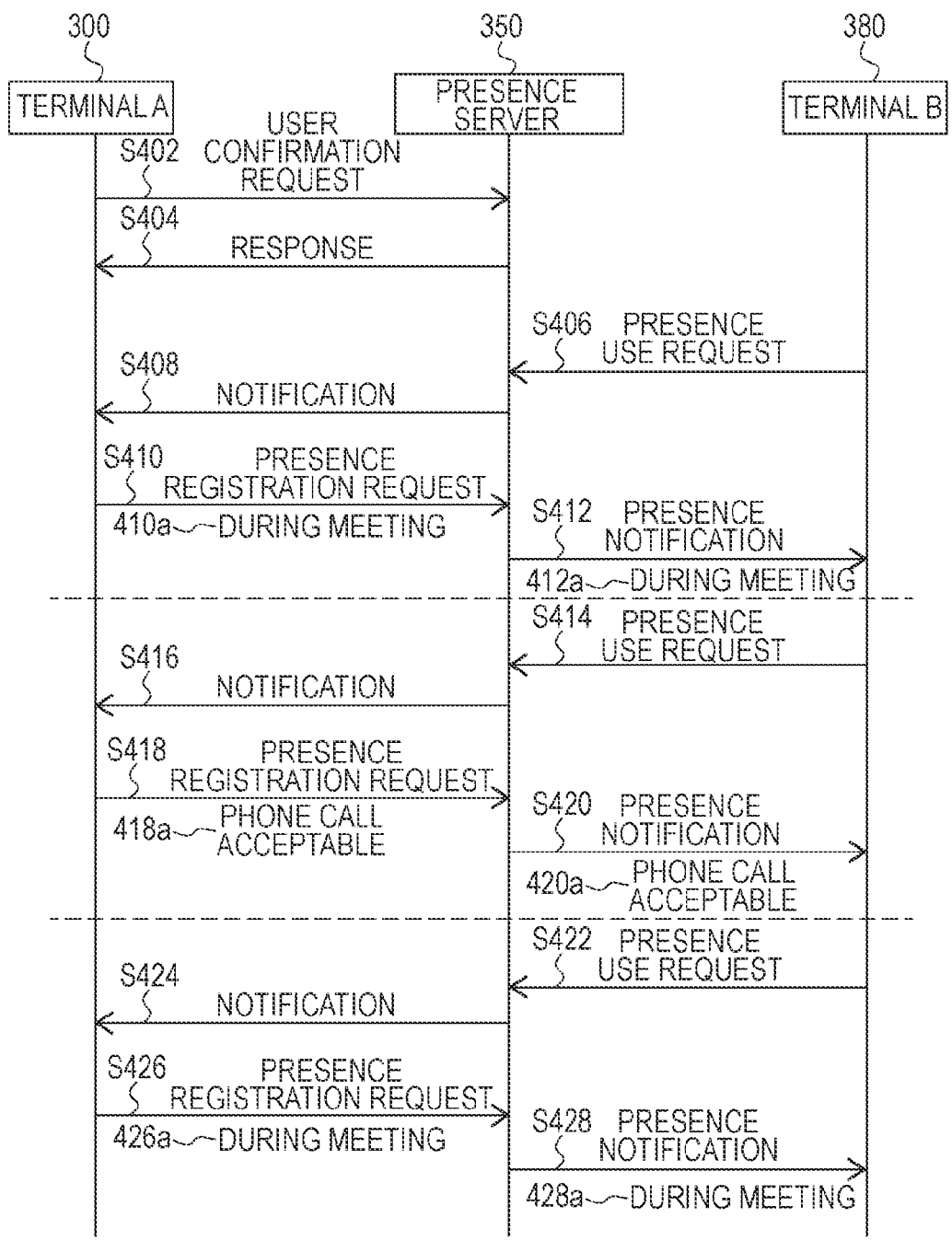
FIG. 4 is a flowchart illustrating another general exemplary presence process.

FIG. 4 is a flowchart illustrating another general exemplary presence process. The exemplary process illustrated in the flowchart in FIG. 4 is not a process according to the exemplary embodiments. In the exemplary process illustrated in FIG. 4, the states of the user of the terminal A 300 are added to the exemplary process illustrated in FIG. 3 as the presence registration request from the terminal A 300 and as the presence notification to the terminal B 380.

Referring to FIG. 4, in Step S402, the terminal A 300 submits the user confirmation request to the presence server 350. Step S402 is the same as Step S302 illustrated in FIG. 3.

In Step S404, the presence server 350 returns a response to the terminal A 300. Step S404 is the same as Step S304 illustrated in FIG. 3.

In Step S406, the terminal B 380 submits the presence use request to the presence server 350.

In Step S408, the presence server 350 notifies the terminal A 300 of the presence use request.

In Step S410, the terminal A 300 submits the presence registration request to the presence server 350 and transmits during meeting 410a to the presence server 350 as the state of the user of the terminal A 300.

In Step S412, the presence server 350 transmits the presence notification to the terminal B 380 and transmits during meeting 412a to the terminal B 380 as the state of the user of the terminal A 300.

In Step S414, the terminal B 380 submits the presence use request to the presence server 350.

In Step S416, the presence server 350 notifies the terminal A 300 of the presence use request.

In Step S418, the terminal A 300 submits the presence registration request to the presence server 350 and transmits phone call acceptable 418a to the presence server 350 as the state of the user of the terminal A 300.

In Step S420, the presence server 350 transmits the presence notification to the terminal B 380 and transmits phone call acceptable 420a to the terminal B 380 as the state of the user of the terminal A 300.

In Step S422, the terminal B 380 submits the presence use request to the presence server 350.

In Step S424, the presence server 350 notifies the terminal A 300 of the presence use request.

In Step S426, the terminal A 300 submits the presence registration request to the presence server 350 and transmits during meeting 426a to the presence server 350 as the state of the user of the terminal A 300.

In Step S428, the presence server 350 transmits the presence notification to the terminal B 380 and transmits during meeting 428a to the terminal B 380 as the state of the user of the terminal A 300.

As described above, the submission of the presence use request is performed multiple times when the user of the terminal B 380 wants the communication by the F2F in the process that is not according to the exemplary embodiments to cause wasteful communication (Step S410 and the subsequent steps) until the user of the terminal B 380 is capable of accepting the F2F.

Figure 5:
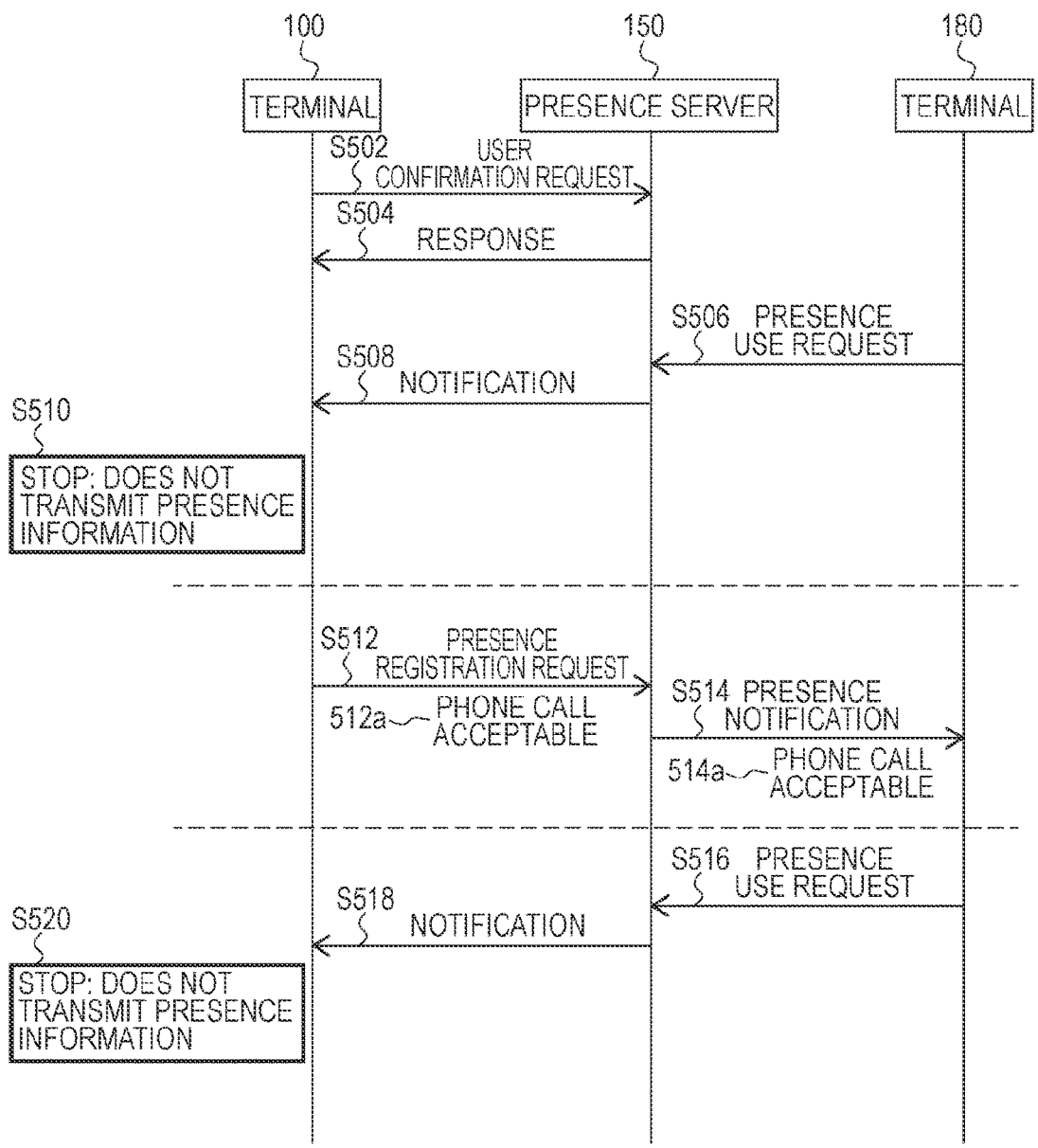
FIG. 5 is a flowchart illustrating an exemplary process according to the first exemplary embodiment.

FIG. 5 is a flowchart illustrating an exemplary process according to the first exemplary embodiment.

Referring to FIG. 5, in Step S502, the terminal 100 submits the user confirmation request to the presence server 150. Step S502 is the same as Step S302 illustrated in FIG. 3.

In Step S504, the presence server 150 returns a response to the terminal 100. Step S504 is the same as Step S304 illustrated in FIG. 3. Although the processing corresponding to the Step S502 and Step S504 is not described in flowcharts illustrated in FIG. 6 and the subsequent drawings, the processing may be performed as preprocessing.

In Step S506, the terminal 180 submits the presence use request to the presence server 150.

In Step S508, the presence server 150 notifies the terminal 100 of the presence use request.

In Step S510, no presence information is transmitted because <Stop>: the state of the user of the terminal 100 is during a meeting. Specifically, the user state acquisition module 110 extracts the fact that the state of the user of the terminal 100 is during a meeting from the electronic diary as the current state of the user of the terminal 100, the determination module 115 determines that the communication method is non-acceptable in the during-meeting state, and the communication control module 120 controls the communication module 105 so as not to transmit the presence registration request.

In Step S512, the terminal 100 submits the presence registration request to the presence server 150 and transmits phone call acceptable 512a to the presence server 150 as the state of the user of the terminal 100. Specifically, the user state acquisition module 110 extracts completion of the meeting (phone call acceptable) from the during-meeting state as the current state of the user of the terminal 100, the determination module 115 determines that the communication method is acceptable in the completion-of-the-meeting state (phone call acceptable), and the communication control module 120 controls the communication module 105 so as to transmit the presence registration request.

In Step S514, the presence server 150 transmits the presence notification to the terminal 180 and transmits phone call acceptable 514a to the terminal 180 as the state of the user of the terminal 100.

In Step S516, the terminal 180 submits the presence use request to the presence server 150.

In Step S518, the presence server 150 notifies the terminal 100 of the presence use request.

In Step S520, no presence information is transmitted because <Stop>: the state of the user of the terminal 100 is during a meeting.

Figure 6:
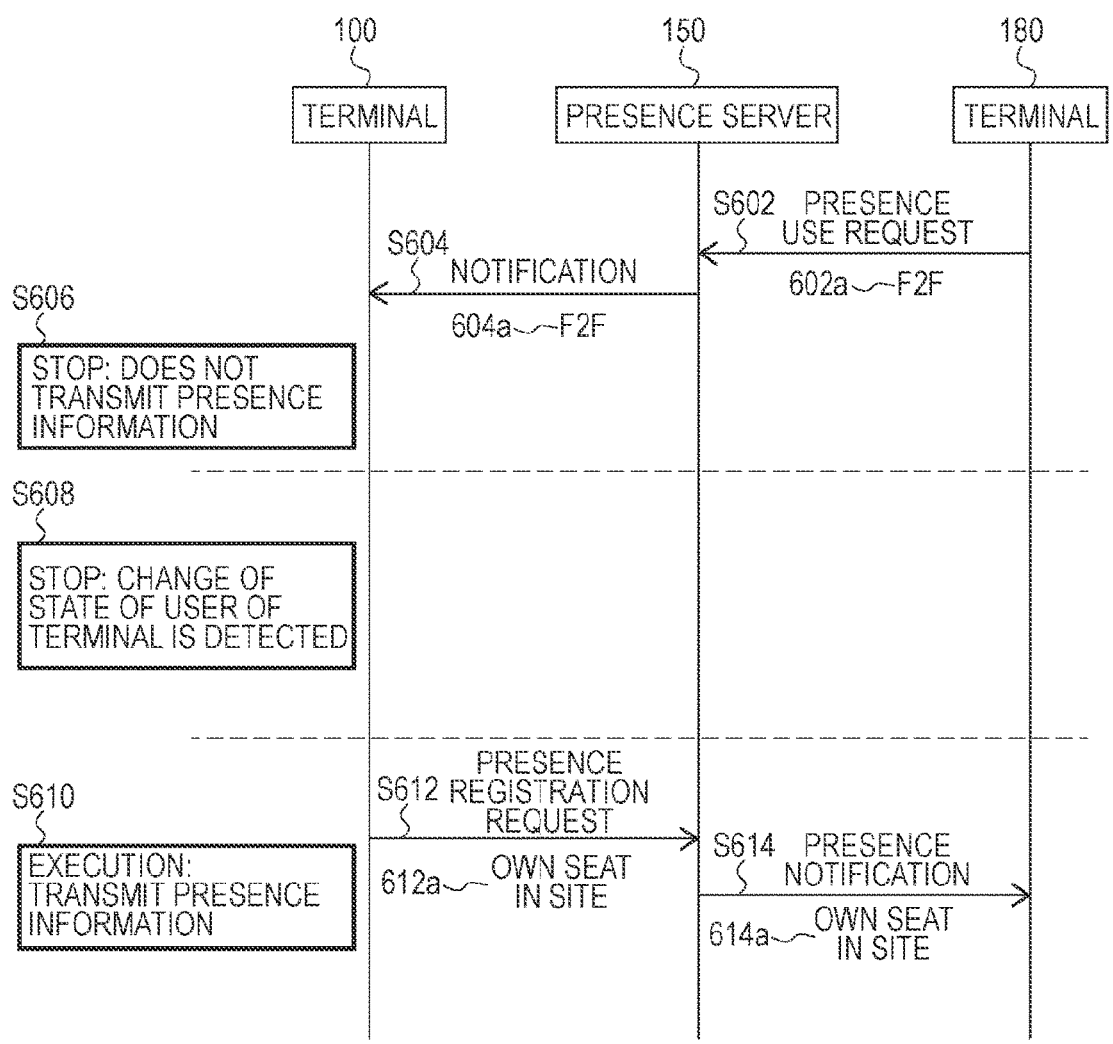
FIG. 6 is a flowchart illustrating another exemplary process according to the first exemplary embodiment.

FIG. 6 is a flowchart illustrating another exemplary process according to the first exemplary embodiment. This flowchart illustrates an exemplary process in a case in which the communication method ("F2F" here) from the user of the terminal 180 to the user of the terminal 100 is included in the presence use request. In other words, it is determined whether the communication method is acceptable in this exemplary process.

Referring to FIG. 6, in Step S602, the terminal 180 submits the presence use request to the presence server 150 and transmits F2F 602a which the user of the terminal 180 wants as the communication method with the user of the terminal 100 to the presence server 150.

In Step S604, the presence server 150 notifies the terminal 100 of the presence use request and transmits F2F 604a which the user of the terminal 180 wants as the communication method with the user of the terminal 100 to the terminal 100.

In Step S606, no presence information is transmitted because <Stop>: the state of the user of the terminal 100 is "during a meeting in a customer site" and the F2F 602a is non-acceptable.

In Step S608, <Stop>: the change of the state of the user of the terminal 100 is detected. No presence information is transmitted because, even if the state of the user of the terminal 100 is changed to "walking outside", the F2F 602a is non-acceptable in the "walking-outside" state.

In Step S610, the presence information is transmitted because <Execution>: the change of the state of the user of the terminal 100 to "own seat in site 612a" is detected and the F2F 602a is acceptable.

In Step S612, the terminal 100 submits the presence registration request to the presence server 150 and transmits the own seat in site 612*a* to the presence server 150 as the state of the user of the terminal 100.

In Step S614, the presence server 150 transmits the presence notification to the terminal 180 and transmits own seat in site 614*a* to the terminal 180 as the state of the user of the terminal 100.

Figure 7:
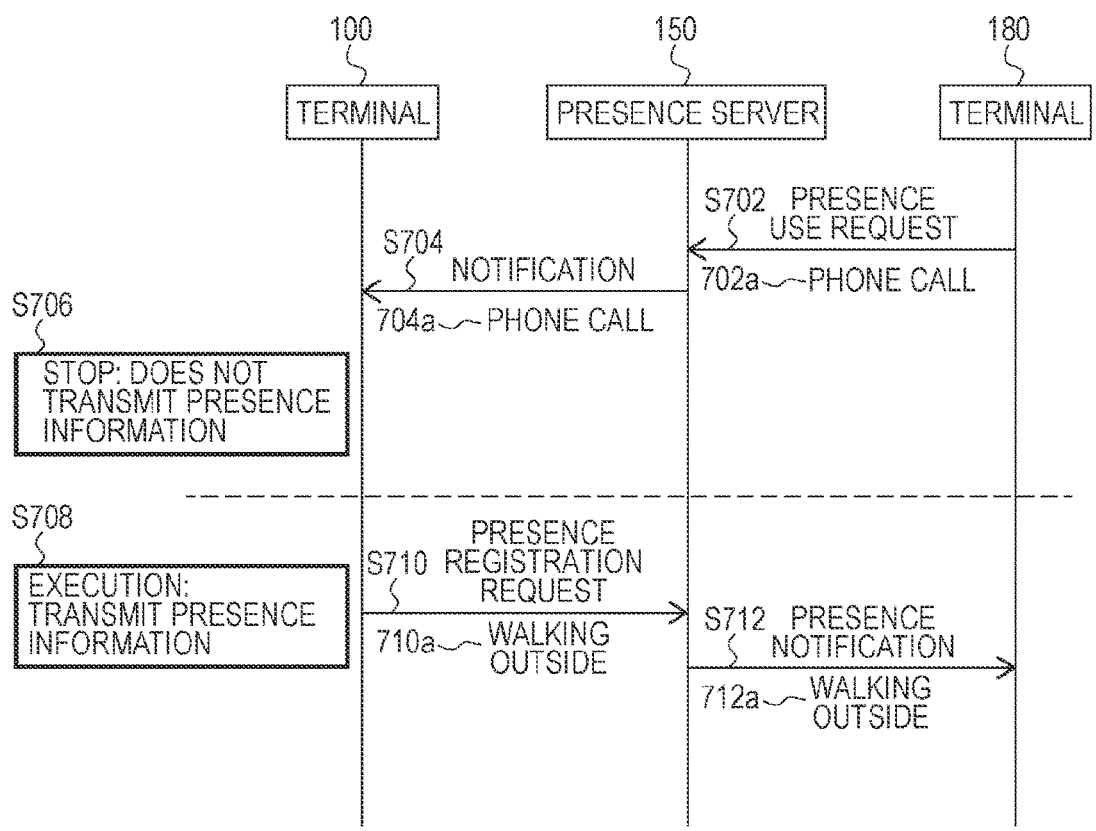
FIG. 7 is a flowchart illustrating another exemplary process according to the first exemplary embodiment.

FIG. 7 is a flowchart illustrating another exemplary process according to the first exemplary embodiment. This flowchart illustrates an exemplary process in a case in which the communication method ("phone call" here) from the user of the terminal 180 to the user of the terminal 100 is included in the presence use request. In other words, it is determined whether the communication method is acceptable in this exemplary process.

Referring to FIG. 7, in Step S702, the terminal 180 submits the presence use request to the presence server 150 and transmits phone call 702*a* which the user of the terminal 180 wants as the communication method with the user of the terminal 100 to the presence server 150.

In Step S704, the presence server 150 notifies the terminal 100 of the presence use request and transmits phone call 704*a* which the user of the terminal 180 wants as the communication method with the user of the terminal 100 to the terminal 100.

In Step S706, no presence information is transmitted because <Stop>: the state of the user of the terminal 100 is "during a meeting in a customer site" and the phone call 702*a* is non-acceptable.

In Step S708, the presence information is transmitted because <Execution>: the change of the state of the user of the terminal 100 to "walking outside 710*a*" is detected and the phone call 702*a* is acceptable. In other words, when the communication method is the phone call, it is determined that the communication method is non-acceptable in the "during a meeting in a customer site" state and that the communication method is acceptable in the state "walking outside 710*a*."

In step S710, the terminal 100 submits the presence registration request to the presence server 150 and transmits the walking outside 710*a* to the presence server 150 as the state of the user of the terminal 100.

In Step S712, the presence server 150 transmits the presence notification to the terminal 180 and transmits walking outside 712*a* to the terminal 180 as the state of the user of the terminal 100.

Figure 8:
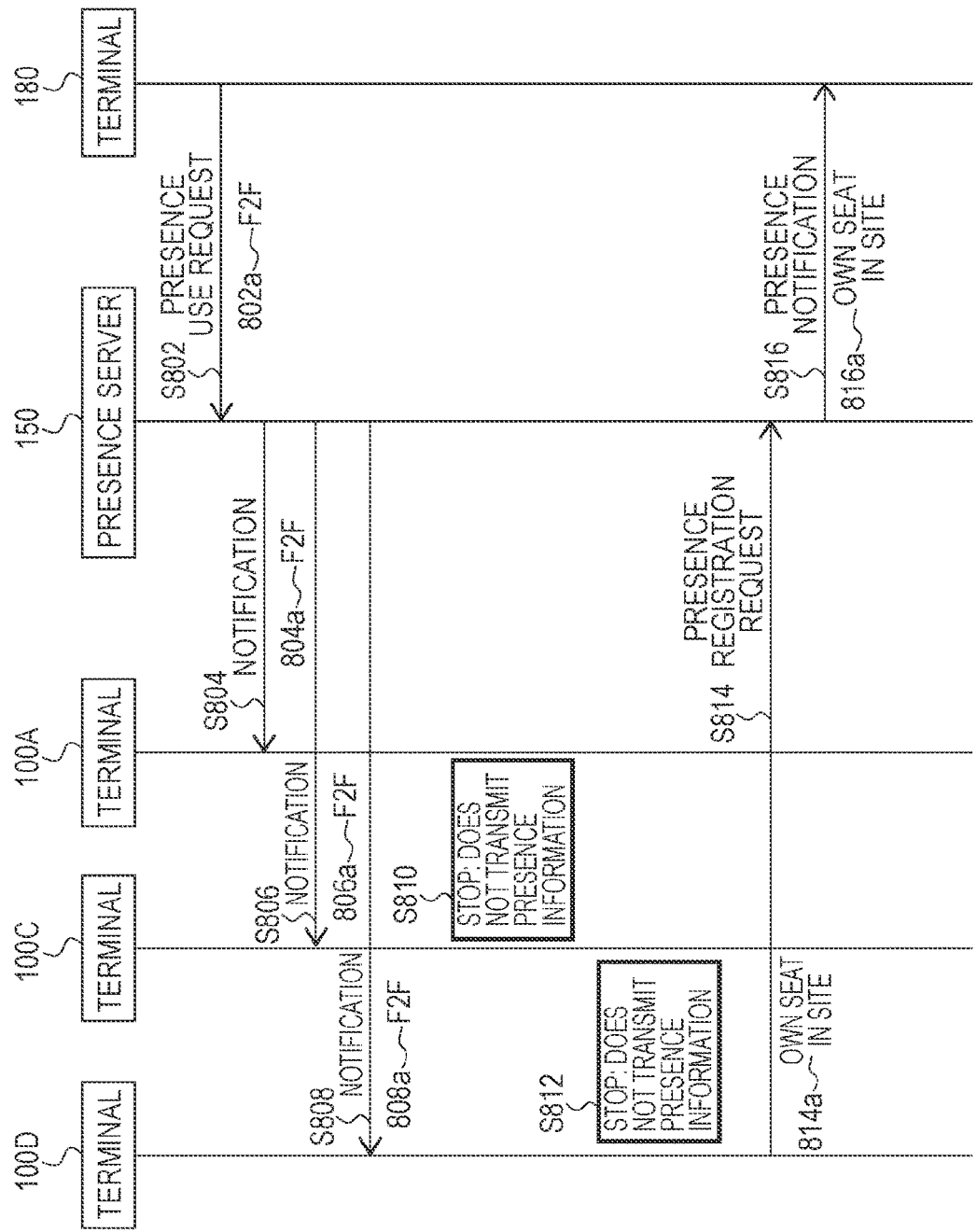
FIG. 8 is a flowchart illustrating another exemplary process according to the first exemplary embodiment.

FIG. 8 is a flowchart illustrating another exemplary process according to the first exemplary embodiment. This flowchart illustrates an exemplary process in a case in which multiple terminals receive the presence use request. Specifically, the user of the terminal 180 wants to communicate by the F2F with the users of the terminal 100A, the terminal 100C, and the terminal 100D.

Referring to FIG. 8, in Step S802, the terminal 180 submits the presence use request to the presence server 150 and transmits F2F 802*a* which the user of the terminal 180 wants as the communication method with the users of the terminal 100A, the terminal 100C, and the terminal 100D to the presence server 150.

In Step S804, the presence server 150 notifies the terminal 100A of the presence use request and transmits F2F 804*a* which the user of the terminal 180 wants as the communication method with the user of the terminal 100A to the terminal 100A.

In Step S806, the presence server 150 notifies the terminal 100C of the presence use request and transmits F2F 806*a* which the user of the terminal 180 wants as the communication method with the user of the terminal 100C to the terminal 100C.

In Step S808, the presence server 150 notifies the terminal 100D of the presence use request and transmits F2F 808*a* which the user of the terminal 180 wants as the communication method with the user of the terminal 100D to the terminal 100D. The processing from Step S804 to Step S808 may broadcasted.

In Step S810, no presence information is transmitted because <Stop>: the state of the user of the terminal 100A is "during a meeting in a customer site" and the F2F 802*a* is non-acceptable in the "during a meeting in a customer site" state. Specifically, the user state acquisition module 110 in the terminal 100A extracts the "during a meeting in a customer site" as the state of the user of the terminal 100A, the determination module 115 determines that the F2F is non-acceptable in the during-meeting-in-customer-site state, and the communication control module 120 controls the communication module 105 so as not to transmit the presence registration request.

In Step S812, no presence information is transmitted because <Stop>: the state of the user of the terminal 100C is "walking outside" and the F2F 802*a* is non-acceptable in the "walking outside" state. Specifically, the user state acquisition module 110 in the terminal 100C extracts the "walking outside" as the state of the user of the terminal 100C, the determination module 115 determines that the F2F is non-acceptable in the walking-outside state, and the communication control module 120 controls the communication module 105 so as not to transmit the presence registration request.

In Step S814, the terminal 100D submits the presence registration request to the presence server 150 and transmits own seat in site 814*a* to the presence server 150 as the state of the user of the terminal 100D. Specifically, the user state acquisition module 110 in the terminal 100D extracts the own seat in site 814*a* as the state of the user of the terminal 100D, the determination module 115 determines that the F2F is acceptable in the own-seat-in-site state, and the communication control module 120 controls the communication module 105 so as to transmit the presence registration request.

In Step S816, the presence server 150 transmits the presence notification to the terminal 180 and transmits own seat in site 816*a* to the terminal 180 as the state of the user of the terminal 100D.

In the exemplary process in FIG. 8, the presence registration request is transmitted only from the terminal (the terminal 100D) the F2F is established for the user of which to decrease the communication count.

Figure 9:
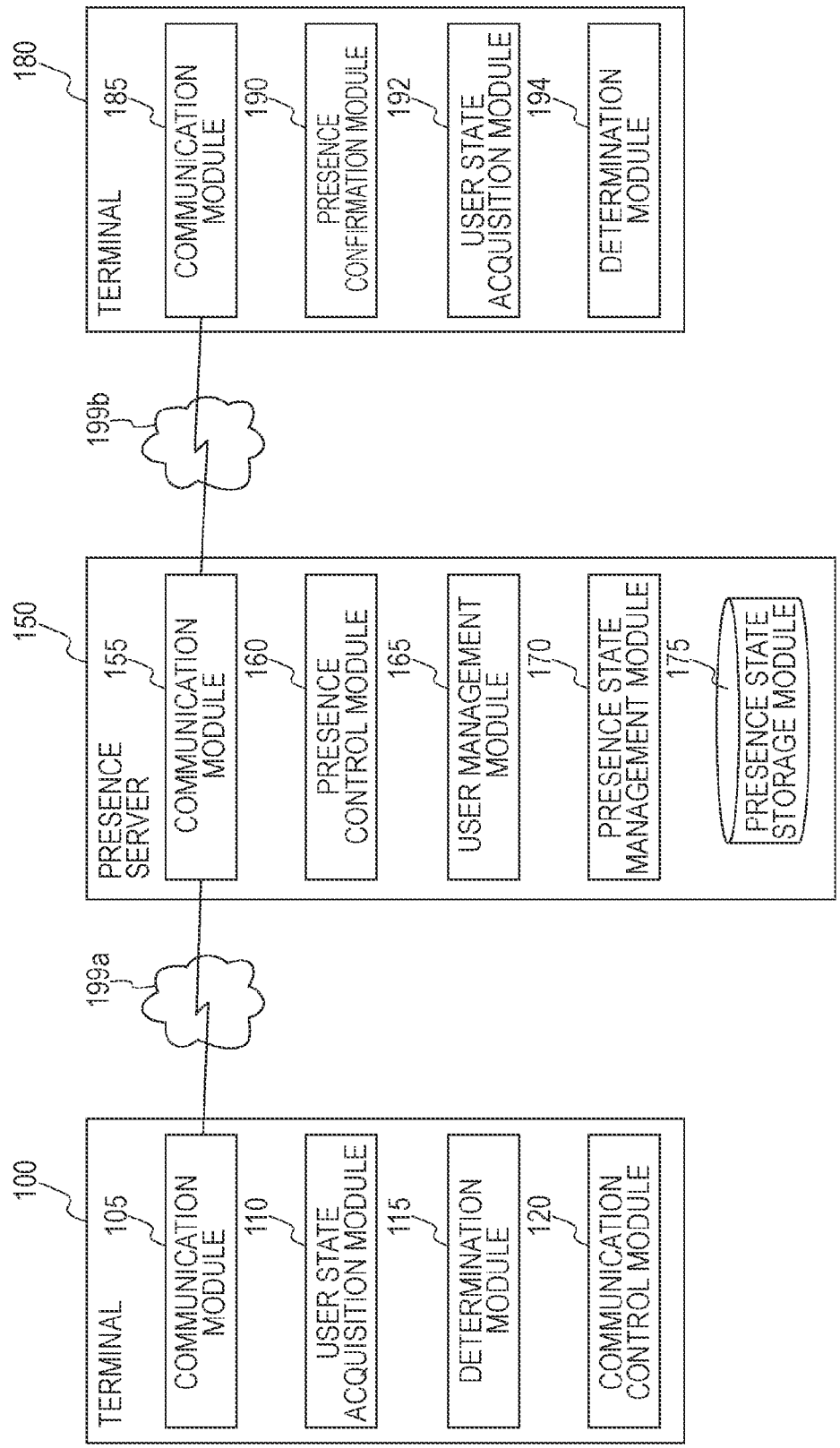
FIG. 9 conceptually illustrates the module configuration diagram of an exemplary configuration according to a second exemplary embodiment.

FIG. 9 conceptually illustrates the module configuration diagram of an exemplary configuration according to a second exemplary embodiment. The configuration of the second exemplary embodiment illustrated in FIG. 9 results from addition of a user state acquisition module 192 and a determination module 194 to the terminal 180 of the first exemplary embodiment illustrated in FIG. 1. The same reference numerals are used in FIG. 9 to identify the same components illustrated in FIG. 1. A duplicated description of such components is omitted herein. The same applies to the following module configuration diagram. In the second exemplary embodiment, if the user of the terminal 180 enters the state in which the communication method is non-acceptable after the state of the user of the terminal 180 is also acquired and the presence use request including the communication method is submitted, the submission of the presence use request is stopped.

Referring to FIG. 9, the terminal 180 includes the communication module 185, the presence confirmation module 190, the user state acquisition module 192, and the determination module 194.

The communication module 185 transmits the notification to inquire about the state of the user of the terminal 100 and the communication method to the portable terminal 100.

The user state acquisition module 192 acquires the state of the user of the portable terminal 180. The user state acquisition module 192 performs processing similar to that of the user state acquisition module 110 in the terminal 100 to acquire the state of the user of the terminal 180.

The determination module 194 determines whether the communication method is non-acceptable in the state acquired by the user state acquisition module 192 after the notification is transmitted by the communication module 185. The determination module 194 performs processing similar to that of the determination module 115 in the terminal 100 to determine whether the communication method is acceptable in the state of the user of the terminal 180.

The communication module 185 transmits a notification to stop the inquiry to the terminal 100 if the determination module 194 determines that the communication method is not acceptable in the state of the user of the terminal 180.

Figure 10:
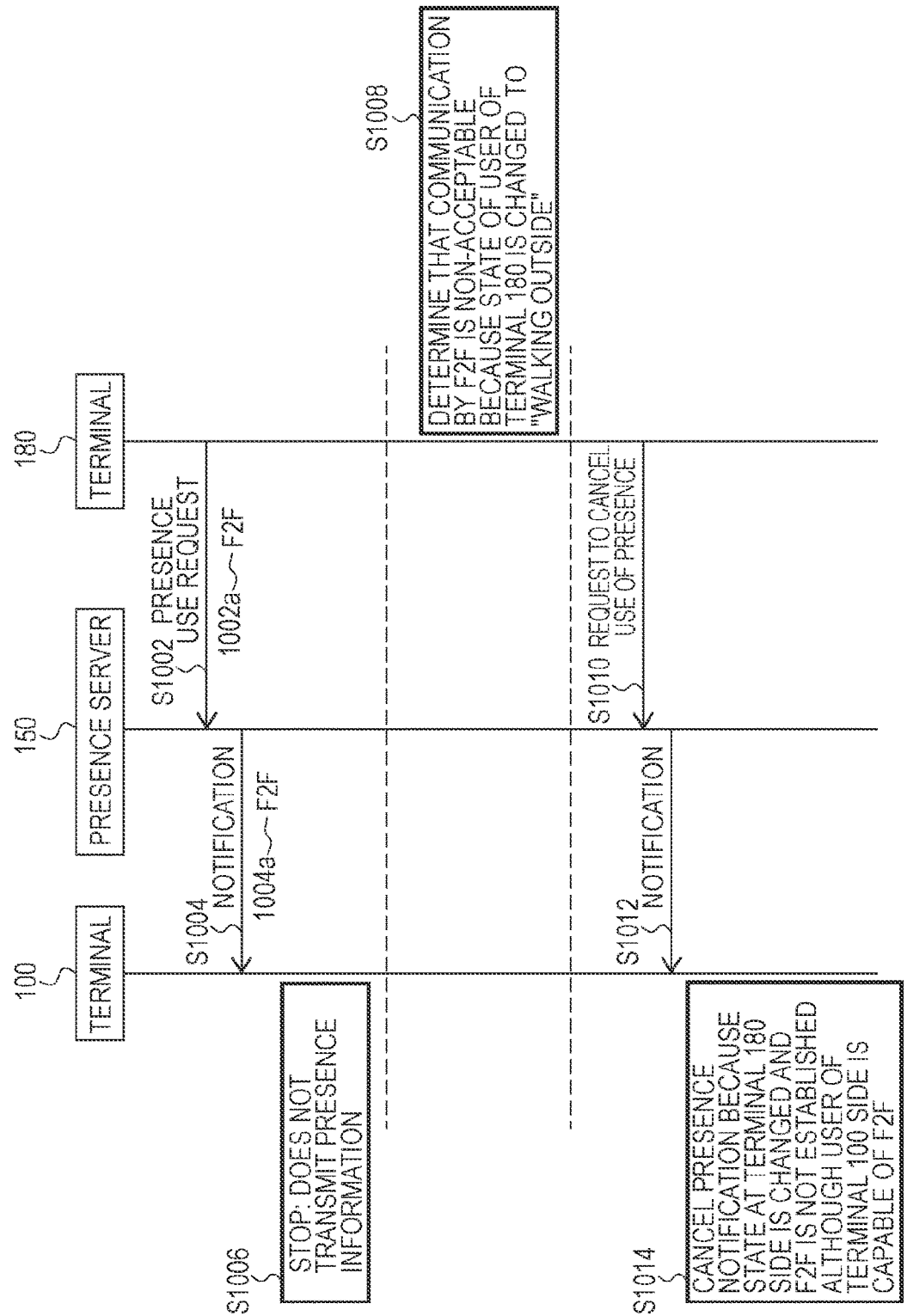
FIG. 10 is a flowchart illustrating an exemplary process according to the second exemplary embodiment.

FIG. 10 is a flowchart illustrating an exemplary process according to the second exemplary embodiment.

Referring to FIG. 10, in Step S1002, the terminal 180 submits the presence use request to the presence server 150 and transmits F2F 1002a which the user of the terminal 180 wants as the communication method with the user of the terminal 100 to the presence server 150.

In Step S1004, the presence server 150 notifies the terminal 100 of the presence use request and transmits F2F 1004a which the user of the terminal 180 wants as the communication method with the user of the terminal 100 to the terminal 100.

In Step S1006, no presence information is transmitted because <Stop>: the state of the user of the terminal 100 is "during a meeting in a customer site" and the F2F 1002a is non-acceptable in the state. Steps S1002 to S1006 are the same as in the first exemplary embodiment.

In Step S1008, it is determined that the communication method, which is the F2F 1002a, is non-acceptable in the state of the user of the terminal 180 because the state of the user of the terminal 180 is changed to "walking outside." Specifically, the user state acquisition module 192 in the terminal 180 extracts "walking outside" as the state of the user of the terminal 180 and the determination module 194 determines that the F2F is non-acceptable in the state of the user of the terminal 180.

In Step S1010, the terminal 180 submits a request to cancel the use of the presence to the presence server 150.

In Step S1012, the presence server 150 notifies the terminal 100 of the cancel of the use of the presence.

In Step S1014, it is not necessary to submit the presence registration request because the state at the terminal 180 side is changed to cancel the use of the presence although the user of the terminal 100 side is capable of the F2F.

Figure 11:
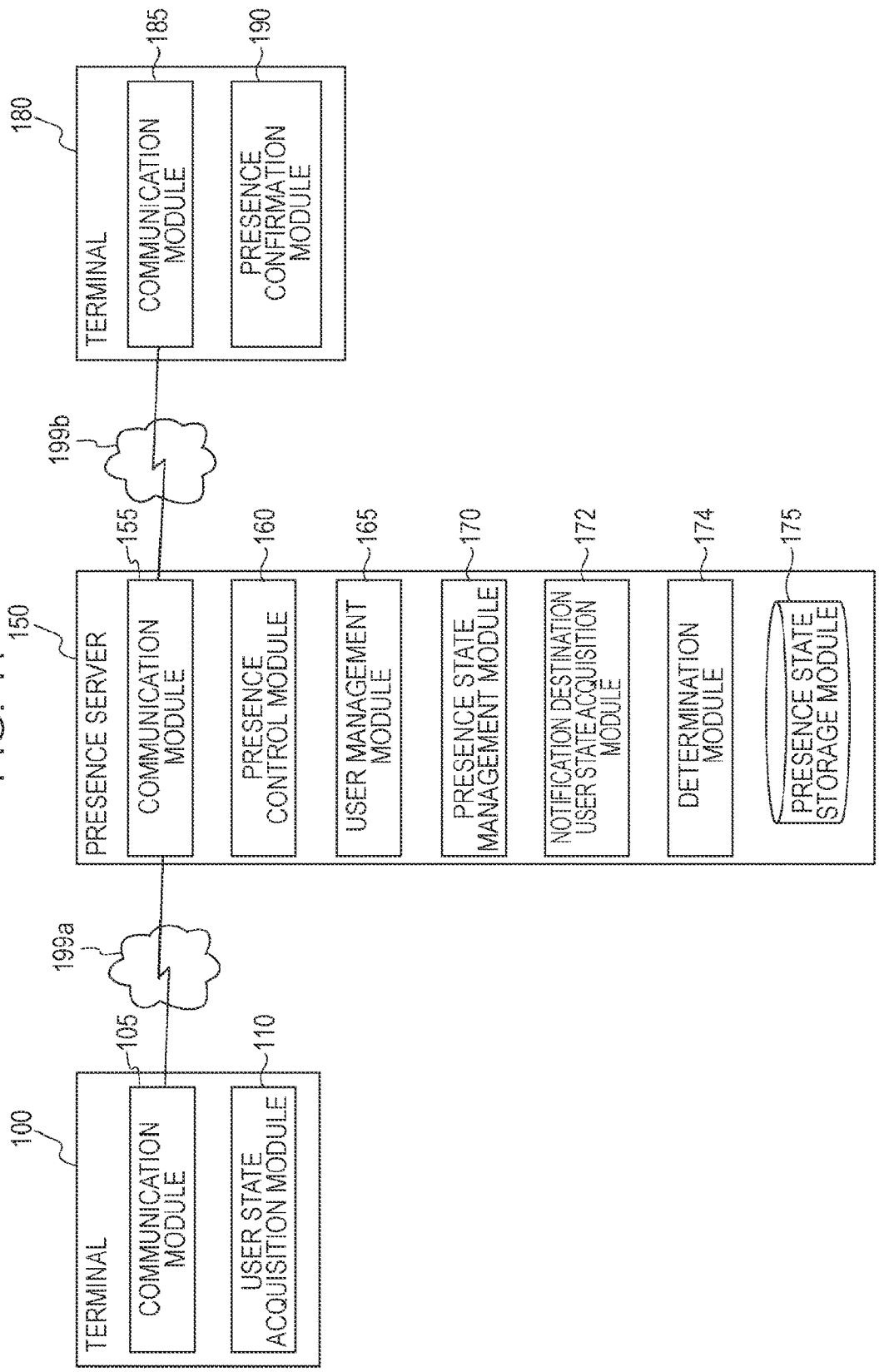
FIG. 11 conceptually illustrates the module configuration diagram of an exemplary configuration according to a third exemplary embodiment.

FIG. 11 conceptually illustrates the module configuration diagram of an exemplary configuration according to a third exemplary embodiment. The configuration of the third exemplary embodiment illustrated in FIG. 11 results from exclusion of the determination module 115 and the communication control module 120 from the terminal 100 of the first exemplary embodiment illustrated in FIG. 1 and addition of a notification destination user state acquisition module 172 and a determination module 174 to the presence server 150 of the first exemplary embodiment illustrated in FIG. 1. The determination processing and so on performed in the terminal 100 and the terminal 180 are performed in the presence server 150 in the third exemplary embodiment. In this case, although the presence registration request and so on are submitted to the presence server 150 even if the communication method is non-acceptable in the terminal 100 and the terminal 180, unnecessary presence notification is not transmitted when the presence server 150 determines that the communication method is non-acceptable.

The terminal 100 includes the communication module 105 and the user state acquisition module 110.

The terminal 180 includes the communication module 185 and the presence confirmation module 190.

The presence server 150 includes the communication module 155, the presence control module 160, the user management module 165, the presence state management module 170, the notification destination user state acquisition module 172, the determination module 174, and the presence state storage module 175.

The communication module 155 receives the notification to inquire about the state of the user of the portable terminal 100 from the portable terminal 180. Upon reception of the notification, the communication module 155 transmits the notification to the terminal 100. The communication module 155 receives the state of the user of the terminal 100 as a reply to the notification transmitted to the terminal 100.

The communication module 155 may receive the communication method from the terminal 180.

The notification destination user state acquisition module 172 acquires the state of the user of the terminal 100 or the terminal 180. The notification destination user state acquisition module 172 performs processing similar to that of the user state acquisition module 110 described above. However, the outputs from the respective sensors in the terminal 100 may be received to recognize the state of the user of the terminal 100 by the notification destination user state acquisition module 172.

The determination module 174 determines whether the request from the terminal 180 is acceptable in the state of the user of the terminal 100, received by the communication module 155.

The determination module 174 may determine whether the communication method received by the communication module 155 is acceptable in the state of the user of the terminal 100 if the notification is received by the communication module 155.

The presence control module 160 controls the communication module 155 so as not to transmit the state of the user of the terminal 100 to the terminal 180 if the determination module 174 determines to be non-acceptable. The presence control module 160 may control the communication module 155 so as to transmit the state of the user of the terminal 100 to the terminal 180 as a reply to the notification received by the communication module 155 only if the determination module 174 determines to be acceptable.

The presence control module 160 may control the transmission so as not to transmit the state of the user of the terminal 100 to the terminal 180 if the determination module 174 determines to be non-acceptable. Alternatively, the presence control module 160 may control the transmission so as not to transmit the notification to the terminal 100 if the determination module 174 determines to be non-acceptable.

Figure 12:
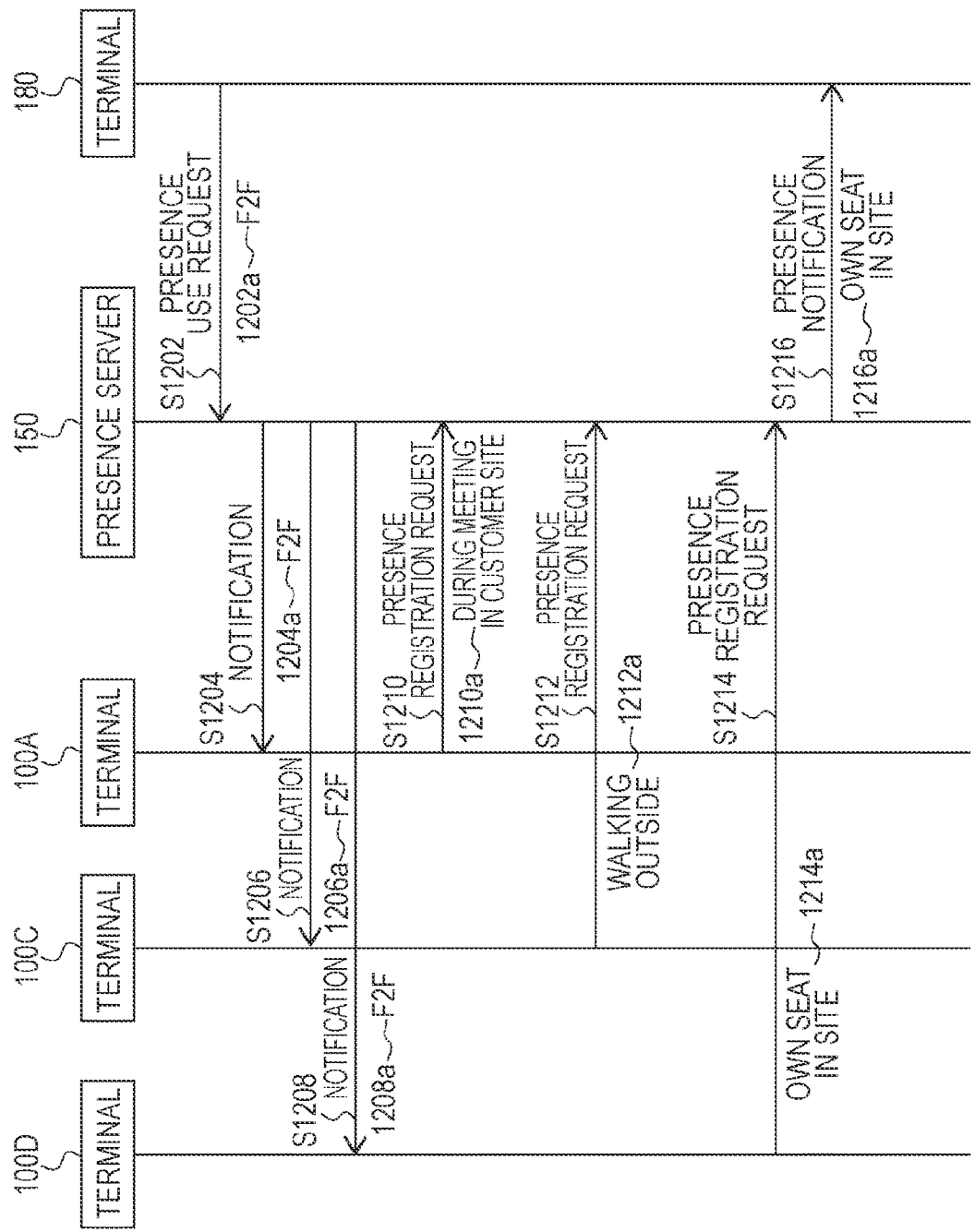
FIG. 12 is a flowchart illustrating an exemplary process according to the third exemplary embodiment.

FIG. 12 is a flowchart illustrating an exemplary process according to the third exemplary embodiment.

Referring to FIG. 12, in Step S1202, the terminal 180 submits the presence use request to the presence server 150 and transmits F2F 1202a which the user of the terminal 180 wants as the communication method with the users of the terminal 100A, the terminal 100C, and the terminal 100D to the presence server 150.

In Step S1204, the presence server 150 notifies the terminal 100A of the presence use request and transmits F2F 1204a which the user of the terminal 180 wants as the communication method with the user of the terminal 100A to the terminal 100A.

In Step S1206, the presence server 150 notifies the terminal 100C of the presence use request and transmits F2F 1206a which the user of the terminal 180 wants as the communication method with the user of the terminal 100C to the terminal 100C.

In Step S1208, the presence server 150 notifies the terminal 100D of the presence use request and transmits F2F 1208a which the user of the terminal 180 wants as the communication method with the user of the terminal 100D to the terminal 100D. The processing from Step S1204 to Step S1208 may broadcasted.

In Step S1210, the terminal 100A submits the presence registration request to the presence server 150 and transmits during meeting in customer site 1210a to the presence server 150 as the state of the user of the terminal 100A.

In Step S1212, the terminal 100C submits the presence registration request to the presence server 150 and transmits walking outside 1212a to the presence server 150 as the state of the user of the terminal 100C.

In Step S1214, the terminal 100D submits the presence registration request to the presence server 150 and transmits own seat in site 1214a to the presence server 150 as the state of the user of the terminal 100D.

In Step S1216, the presence server 150 transmits the presence notification to the terminal 180 and transmits own seat in site 1216a to the terminal 180 as the state of the user of the terminal 100D. Specifically, the notification destination user state acquisition module 172 acquires the states of the users of the terminal 100A, the terminal 100C, and the terminal 100D acquired in Step S1210 to Step S1214. The non-acceptable state table for-every-communication-method 1500 is used to select the terminal 100D the F2F 1202a is acceptable in the state of the user of which and the state of the user of the terminal 100D is transmitted to the terminal 180.

Although the presence registration request, which is the reply to the presence use request, is submitted from each of the terminal 100A, the terminal 100C, and the terminal 100D in the exemplary process illustrated in FIG. 12, only the state of the user of the terminal 100D in which the communication method "F2F" from the terminal 180 is acceptable is transmitted from the presence server 150 to the terminal 180.

Figure 13:
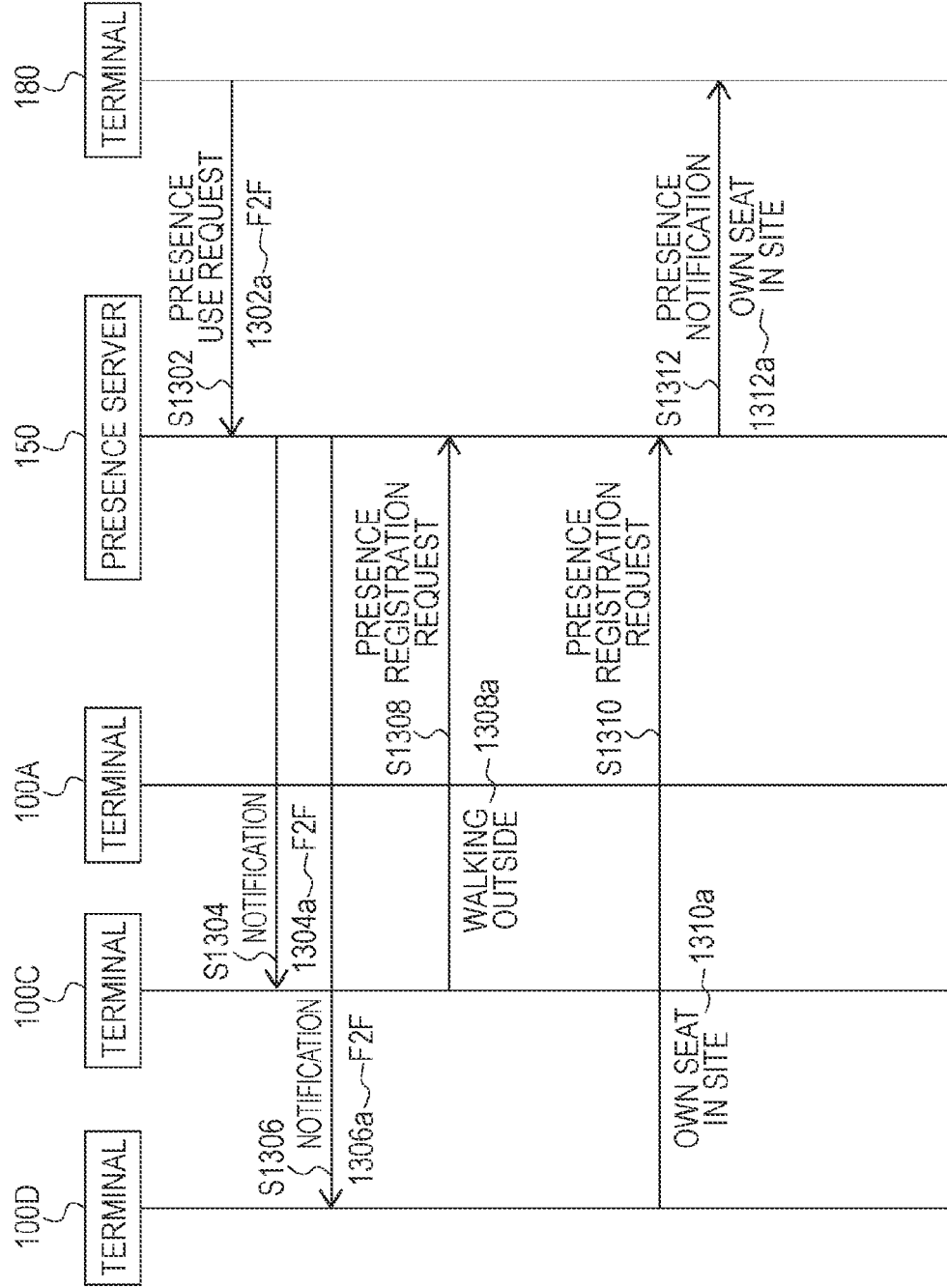
FIG. 13 is a flowchart illustrating another exemplary process according to the third exemplary embodiment.

FIG. 13 is a flowchart illustrating another exemplary process according to the third exemplary embodiment.

Referring to FIG. 13, in Step S1302, the terminal 180 submits the presence use request to the presence server 150 and transmits F2F 1302a which the user of the terminal 180 wants as the communication method with the users of the terminal 100A, the terminal 100C, and the terminal 100D to the presence server 150. Specifically, the notification destination user state acquisition module 172 in the presence server 150 acquires the states of the users of the terminal 100A, the terminal 100C, and the terminal 100D. For example, the notification destination user state acquisition module 172 acquires the current plan from the electronic diary of each user. The determination module 174 uses the non-acceptable state table for-every-communication-method 1500 to determine that the F2F 1302a is acceptable in the states of the users of the terminal 100C and the terminal 100D. Accordingly, the presence control module 160 controls the communication module 155 so as to transmit the notification to the terminal 100C and the terminal 100D but controls the communication module 155 so as not to transmit the notification to the terminal 100A.

In Step S1304, the presence server 150 notifies the terminal 100C of the presence use request and transmits F2F 1304a which the user of the terminal 180 wants as the communication method with the user of the terminal 100C to the terminal 100C.

In Step S1306, the presence server 150 notifies the terminal 100D of the presence use request and transmits F2F 1306a which the user of the terminal 180 wants as the communication method with the user of the terminal 100D to the terminal 100D.

In Step S1308, the terminal 100C submits the presence registration request to the presence server 150 and transmits walking outside 1308a to the presence server 150 as the state of the user of the terminal 100C.

In Step S1310, the terminal 100D submits the presence registration request to the presence server 150 and transmits own seat in site 1310a to the presence server 150 as the state of the user of the terminal 100D.

In Step S1312, the presence server 150 transmits the presence notification to the terminal 180 and transmits own seat in site 1312a to the terminal 180 as the state of the user of the terminal 100D. Specifically, the notification destination user state acquisition module 172 acquires the states of the users of the terminal 100C and the terminal 100D acquired in Step S1308 to Step S1310. The non-acceptable state table for-every-communication-method 1500 is used to select the terminal 100D the F2F 1302a is acceptable in the state of the user of which and the state of the user of the terminal 100D is transmitted to the terminal 180.

In the exemplary process illustrated in FIG. 13, no notification is transmitted to the terminal 100A. Although the presence registration request, which is the reply to the presence use request, is transmitted from each of the terminal 100C and the terminal 100D, only the state of the user of the terminal 100D in which the communication method "F2F" from the terminal 180 is acceptable is transmitted from the presence server 150 to the terminal 180.

Figure 16:
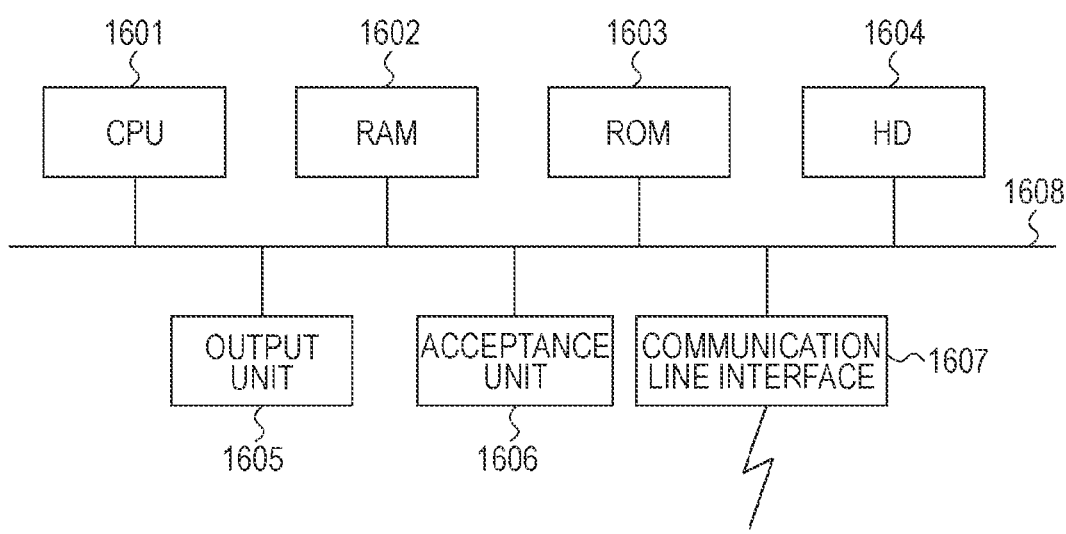
FIG. 16 is a block diagram illustrating an exemplary hardware configuration of a computer realizing the exemplary embodiments.

A computer that executes programs according to the exemplary embodiments (the terminal 100, the presence server 150, and the terminal 180) has a hardware configuration illustrated in FIG. 16. The computer illustrated in FIG. 16 is a general computer and specifically is used as a personal computer, a server, or the like. Specifically, the computer uses a central processing unit (CPU) 1601 as a processing unit (operation unit) and uses a random access memory (RAM) 1602, a read only memory (ROM) 1603, and a hard disk (HD) 1604 as storage units. The computer includes the CPU 1601 that executes the programs including the communication module 105, the user state acquisition module 110, the determination module 115, the communication control module 120, the communication module 155, the presence control module 160, the user management module 165, the presence state management module 170, the presence state storage module 175, the communication module 185, the presence confirmation module 190, the user state acquisition module 192, the determination module 194, the notification destination user state acquisition module 172, and the determination module 174; the RAM 1602 storing the programs and data; the ROM 1603 storing programs for booting the computer and so on; the HD 1604, which is an auxiliary storage unit; an acceptance unit 1606 that accepts data on the basis of an operation by the user with a keyboard, a mouse, a touch panel, or the like; an output unit 1605, such as a cathode ray tube (CRT) or a liquid crystal display; a communication line interface 1607 for connecting to a communication network, such as a network interface card; and a bus 1608 which connects the above components and through which data is exchanged. Multiple computers may be connected to each other via a network.

Although both the terminal 100 and the terminal 180 are portable terminals in the above exemplary embodiments, it is sufficient for at least one of the terminal 100, which is at a request receiving side, and the terminal 180, which is at a requesting side, to be a portable information processing apparatus. When one of the terminal 100 and the terminal 180 is a portable information processing apparatus and the other thereof is a non-portable information processing apparatus (the terminal 180 when the terminal 100 is portable and the terminal 100 when the terminal 180 is portable), for example, a stationary information processing apparatus, such as a desktop personal computer, may be used as the information processing apparatus that is not portable. For example, when the state of the user is acquired by using any sensor in a terminal in the above exemplary embodiments, the other terminal may not be portable if the terminal including the sensor is portable.

In the computer programs according the above exemplary embodiments, the system having the above hardware configuration is caused to read out the computer programs, which are software. The software cooperates with the hardware resources to realize the exemplary embodiments.

The hardware configuration illustrated in FIG. 16 is only an exemplary configuration and the exemplary embodiments are not limited to the configuration illustrated in FIG. 16 as long as the modules described in the above exemplary embodiments are executable in the hardware configuration. For example, part of the modules may be composed of dedicated hardware (for example, an application specific integrated circuit (ASIC)), part of the modules may be in an external system and may be connected via a communication line, or multiple systems illustrated in FIG. 16 may be connected to each other via a communication line for cooperation. In particular, the system illustrated in FIG. 16 may be incorporated in a home information appliance, a copier, a facsimile, a scanner, a printer, or a multifunction peripheral (an image processing apparatus having at least two functions of the scanner, the printer, the copier, the facsimile, and so on), instead of the personal computer.

Although the non-acceptable state list 1400 illustrated in FIG. 14 and the non-acceptable state table for-every-communication-method 1500 illustrated in FIG. 15 each store the non-acceptable conditions, the non-acceptable state list 1400 and the non-acceptable state table for-every-communication-method 1500 may each store acceptable conditions. In this case, the determination of whether the communication method is acceptable in the state is reversely performed.

The programs described above may be stored and provided in a recording medium or may be provided via a communication unit. In this case, the programs described above may be considered as a "computer readable recording medium recording the programs."

The "computer readable recording medium recording the programs" is a recording medium that is readable by a computer in which the programs are recorded and that is used for, for example, installation, execution, and distribution of the programs.

The recording medium may be, for example, a digital versatile disk (DVD), such as "a DVD-R, a DVD-RW, a DVE-RAM, or the like" conforming to a DVD Forum standard or "a DVD+R, a DVD+RW, or the like" conforming to a DVD+RW standard; a compact disc (CD), such as a CD-ROM, a CD-recordable (CD-R), a CD-rewritable (CD-RW), or the like; a Blu-ray (registered trademark) disc; a magneto-optical (MO) disk; a flexible disk (FD); a magnetic tape; a hard disk; a ROM; an electrically erasable and programmable read only memory EEPROM (registered trademark); a flash memory; a RAM; or a secure digital (SD) memory card.

The programs described above or part of the programs may be recorded on the recording medium described above for storage and distribution. The programs described above or part of the programs may be transmitted by communication, for example, via a transmission medium, such as a wired network, a wireless communication network, or a combination of them, which is used in a local area network (LAN), a metropolitan area network (MAN), a wide area network (WAN), the Internet, an intranet, an extranet, or the like. Alternatively, the programs described above or part of the programs may be carried on carriers.

Each of the programs described above may be part of another program or may be recoded on a recording medium along with other programs. The program may be divided to be recorded in multiple recording media. Alternatively, the program may be recorded in any format, such as in a compressed format or encoded format, as long as the program is capable of being decoded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A mobile device comprising:
   a memory configured to store a table comprising a communication method of the mobile device in association with a condition that indicates a user of the mobile device is unavailable to communicate using the communication method;
   at least one hardware processor configured to:
      receive a request from a counterpart mobile device to communicate with the mobile device using the communication method;
      determine a current state of a user of the mobile device;
      determine whether communication between the mobile device and the counterpart mobile device using the communication method is unavailable based on the current state of the user of the mobile device corresponding to the condition that indicates the user of the mobile device is unavailable to communicate using the communication method stored in the memory;

withhold transmission of presence information of the user of the mobile device indicating that communication between the mobile device and the counterpart mobile device using the communication method is available, in response to determining that communication between the mobile device and the counterpart mobile device using the communication method is unavailable; and transmit to the counterpart mobile device presence information of the user of the mobile device indicating that communication between the mobile device and the counterpart mobile device using the communication method is available based on the current state of the user of the mobile device, in response to determining that communication between the mobile device and the counterpart mobile device using the communication method is available.

2. A non-transitory computer readable medium storing a program causing a mobile device to execute a method of transmitting presence information to a counterpart mobile device, the method comprising:

receiving request from the counterpart mobile device to communicate with the mobile device using a communication method;

determining a current state of a user of the mobile device;

determining, by reading a table comprising the communication method of the mobile device in association with a condition that indicates the user of the mobile device is unavailable to communicate using the communication method stored in a memory of the mobile device, whether communication between the mobile device and the counterpart mobile device using the communication method is unavailable based on the current state of the user of the mobile device corresponding to the condition that indicates the user of the mobile device is unavailable to communicate using the communication method stored in the memory;

withholding transmission of presence information of the user of the mobile device indicating that communication between the mobile device and the counterpart mobile device using the communication method is available, in response to determining that communication between the mobile device and the counterpart mobile device using the communication method is unavailable; and transmitting to the counterpart mobile device presence information of the user of the mobile device indicating that communication between the mobile device and the counterpart mobile device using the communication method is available based on the current state of the user of the mobile device, in response to determining that communication between the mobile device and the counterpart mobile device using the communication method is available.

3. A method of a mobile device transmitting presence information to a counterpart mobile device, the method comprising:

receiving request from the counterpart mobile device to communicate with the mobile device using a communication method;

determining a current state of a user of the mobile device;

determining, by reading a table comprising the communication method of the mobile device in association with a condition that indicates the user of the mobile device is unavailable to communicate using the communication method stored in a memory of the mobile device, whether communication between the mobile device and the counterpart mobile device using the communication method is unavailable based on the current state of the user of the mobile device corresponding to the condition that indicates the user of the mobile device is unavailable to communicate using the communication method stored in the memory;

withholding transmission of presence information of the user of the mobile device indicating that communication between the mobile device and the counterpart mobile device using the communication method is available, in response to determining that communication between the mobile device and the counterpart mobile device using the communication method is unavailable; and transmitting to the counterpart mobile device presence information of the user of the mobile device indicating that communication between the mobile device and the counterpart mobile device using the communication method is available based on the current state of the user of the mobile device, in response to determining that communication between the mobile device and the counterpart mobile device using the communication method is available.

4. The mobile device according to claim 1, wherein the condition comprises at least one of a location of the mobile device, a movement state of the mobile device, and a state of the user of the mobile device.

5. The mobile device according to claim 4, wherein the condition is the location of the mobile device, wherein the mobile device further comprises a global positioning system (GPS) sensor configured to determine a current location of the mobile device, and wherein the at least one hardware processor is configured to determine the current state of the user of the mobile device corresponds to the current location of the mobile device determined by the GPS sensor and configured to determine that communication between the mobile device and the counterpart mobile device using the communication method is unavailable based on the current location of the mobile device determined by the GPS sensor corresponding to the location of the mobile device stored in the memory.

6. The mobile device according to claim 1, wherein the condition is the movement state of the mobile device, wherein the mobile device further comprises an acceleration sensor configured to determine a current movement of the mobile device, and wherein the at least one hardware processor is configured to determine the current state of the user of the mobile device corresponds to the current movement of the mobile device determined by the acceleration sensor and configured to determine that communication between the mobile device and the counterpart mobile device using the communication method is unavailable based on the current movement of the mobile device determined by the acceleration sensor corresponding to the movement state of the mobile device stored in the memory.

7. The mobile device according to claim 4, wherein the condition is the state of the user of the mobile device, and wherein the at least one hardware processor is configured to determine the current state of the user of the mobile device based on an electronic diary of the user of the mobile device and configured to determine that communication between the mobile device and the counterpart mobile device using the communication method is unavailable based on the current state of the user of the mobile device corresponding to the state of the user of the mobile device stored in the memory.

8. The mobile device according to claim 1, wherein the condition comprises a location of the mobile device and a state of the user of the mobile device.

9. The mobile device according to claim 8, wherein the mobile device further comprises a global positioning system (GPS) sensor configured to determine a current location of the mobile device, and
wherein the at least one hardware processor is configured to determine the current state of the user of the mobile device corresponds to the current location of the mobile device determined by the GPS sensor and corresponds to a user status in an electronic diary of the user of the mobile device, and configured to determine that communication between the mobile device and the counterpart mobile device using the communication method is unavailable based on the current location of the mobile device determined by the GPS sensor corresponding to the location of the mobile device stored in the memory and based on the current state of the user of the mobile device corresponding to the user status in the electronic diary stored in the memory.

10. The mobile device according to claim 1, wherein the communication method of the mobile device in association with the condition that indicates the user of the mobile device is unavailable to communicate using the communication method comprises:
a first communication method in association with a first condition that indicates the user of the mobile device is unavailable to communicate using the first communication method; and
a second communication method in association with a second condition that indicates the user of the mobile device is unavailable to communicate using the second communication method.

11. The mobile device according to claim 10, wherein the first condition comprises at least one of a first location of the mobile device, a first movement state of the mobile device, and a first state of the user of the mobile device, and
wherein the second condition comprises at least one of a second location of the mobile device, a second movement state of the mobile device, and a second state of the user of the mobile device.

12. The mobile device according to claim 11, wherein the first condition is the first location of the mobile device,
wherein the second condition is the second location of the mobile device,
wherein the mobile device further comprises a global positioning system (GPS) sensor configured to determine a current location of the mobile device, and
wherein the at least one hardware processor is configured to determine the current state of the user of the mobile device corresponds to the current location of the mobile device determined by the GPS sensor, configured to determine that communication between the mobile device and the counterpart mobile device using the first communication method is unavailable based on the current location of the mobile device determined by the GPS sensor corresponding to the first location of the mobile device stored in the memory, and configured to determine that communication between the mobile device and the counterpart mobile device using the second communication method is unavailable based on the current location of the mobile device determined by the GPS sensor corresponding to the second location of the mobile device stored in the memory.

13. The mobile device according to claim 11, wherein the first condition is the first movement state of the mobile device,
wherein the second condition is the second movement state of the mobile device,
wherein the mobile device further comprises an acceleration sensor configured to determine a current movement of the mobile device, and
wherein the at least one hardware processor is configured to determine the current state of the user of the mobile device corresponds to the current movement of the mobile device determined by the acceleration sensor, configured to determine that communication between the mobile device and the counterpart mobile device using the first communication method is unavailable based on the current movement of the mobile device determined by the acceleration sensor corresponding to the first movement state of the mobile device stored in the memory, and configured to determine that communication between the mobile device and the counterpart mobile device using the second communication method is unavailable based on the current movement of the mobile device determined by the acceleration sensor corresponding to the second movement state of the mobile device stored in the memory.

14. The mobile device according to claim 11, wherein the first condition is the first state of the user of the mobile device,
wherein the second condition is the second state of the user of the mobile device, and
wherein the at least one hardware processor is configured to determine the current state of the user of the mobile device based on an electronic diary of the user of the mobile device, configured to determine that communication between the mobile device and the counterpart mobile device using the first communication method is unavailable based on the current state of the user of the mobile device corresponding to the first state of the user of the mobile device stored in the memory, and configured to determine that communication between the mobile device and the counterpart mobile device using the second communication method is unavailable based on the current state of the user of the mobile device corresponding to the second state of the user of the mobile device stored in the memory.

* * * * *